United States Patent [19]
Crow et al.

[11] Patent Number: 6,161,810
[45] Date of Patent: Dec. 19, 2000

[54] TORSION ROD HOLDDOWN APPARATUS FOR A BATTERY

[75] Inventors: Jerry V. Crow, Muncie; Dane E. Carter; Tracy Frye Strickland, both of Noblesville; Bruce V. Lyons, Fishers, all of Ind.

[73] Assignee: Delphi Technologies, Inc., Troy, Mich.

[21] Appl. No.: 09/250,674

[22] Filed: Feb. 16, 1999

[51] Int. Cl.7 .................................................. A47B 97/00
[52] U.S. Cl. .......................................... 248/503; 180/68.5
[58] Field of Search ..................................... 248/503, 500, 248/651, 680, 681, 506, 231.41; 180/68.5; 429/121, 100

[56] References Cited

U.S. PATENT DOCUMENTS

| | | | |
|---|---|---|---|
| 2,326,481 | 8/1943 | Meyer | 180/68.5 |
| 2,453,835 | 11/1948 | Donkin | 180/68.5 |
| 2,853,143 | 9/1958 | Bergman | 180/68.5 |
| 3,033,304 | 5/1962 | Kramer | 180/68.5 |
| 3,165,163 | 1/1965 | Holka | 180/68.5 |
| 3,333,810 | 8/1967 | Schlapman | 248/361 |
| 3,866,704 | 2/1975 | Bowers et al. | 180/68.5 |
| 4,682,751 | 7/1987 | Tamas | 248/503 |
| 4,854,540 | 8/1989 | Balek | 248/503 |
| 4,966,346 | 10/1990 | Karna et al. | 248/503 |
| 5,132,194 | 7/1992 | Williams | 429/121 |
| 5,222,711 | 6/1993 | Bell | 248/503 |
| 5,823,502 | 10/1998 | Greiner et al. | 248/503 |

*Primary Examiner*—Ramon O. Ramirez
*Assistant Examiner*—Tan Le
*Attorney, Agent, or Firm*—Margaret A. Dobrowitsky

[57] ABSTRACT

An automotive battery is maintained in a tray mounted to the vehicle. The tray has a hinge mechanism in which a torsion rod is pivotally mounted. The torsion rod has a holddown portion which engages a complementary component on the battery to hold the battery in the desired operating location. A latch member on the tray cooperates with the torsion rod to restrain the torsion rod in a latched condition such that a continuous holddown force is exerted on the battery.

6 Claims, 7 Drawing Sheets

TORSION ROD HOLDDOWN APPARATUS FOR A BATTERY

TECHNICAL FIELD

This invention relates to the securement of an electrical storage battery in a tray. More particularly this invention relates to structures which position and retain an automotive battery in a tray.

BACKGROUND OF THE INVENTION

Automotive batteries are usually located in the front of a vehicle near the engine. The battery is positioned in a tray which is secured to a body component of the vehicle. The battery is secured or otherwise held in the tray by external devices. In many installations, the tray has a lower rim and a top holddown bracket. The lower rim is secured to the vehicle and supports the battery. The top holddown bracket is placed around the upper edge of the battery and is secured to the lower rim by threaded fasteners.

At assembly, a worker must position the battery in the lower tray, position the upper tray and secure the fasteners. The battery cables can only be connected after the upper tray is in position. The positioning and manipulation of the fasteners on both the tray and the battery take time and therefore add to the cost of production. If it becomes necessary to replace the battery, after a period of time, the process is reversed. During the life of the vehicle, the fasteners on the tray can become corroded such that removal is difficult and the fasteners may need replacement when a replacement battery is installed. This installation structure requires the use of tools which also add to the cost of initial installation.

SUMMARY OF THE INVENTION

It is an object of the present invention to provide an improved securement structure for an electrical storage battery.

In one aspect of the present invention, a simple and rapid toolless installation apparatus for a battery is provided. In another aspect of the present invention, the apparatus accommodates easy removal for service and replacement of the battery.

In yet another aspect of the present invention, a torsion rod is positioned in a tray for cooperation with latching structures on the battery. In still another aspect of the present invention, the torsion rod is hinged in a tray.

In a further aspect of the present invention, the torsion rod is pivoted on the hinge structure into engagement with a surface on the battery to effect a holddown of the battery. In a yet further aspect of the present invention, the torsion rod is engaged with a latch on the tray to retain contact of the torsion rod with the surface on the battery.

BRIEF DESCRIPTION OF TI DRAWINGS

DESCRIPTION OF EXEMPLARY EMBODIMENTS

Figure 1:
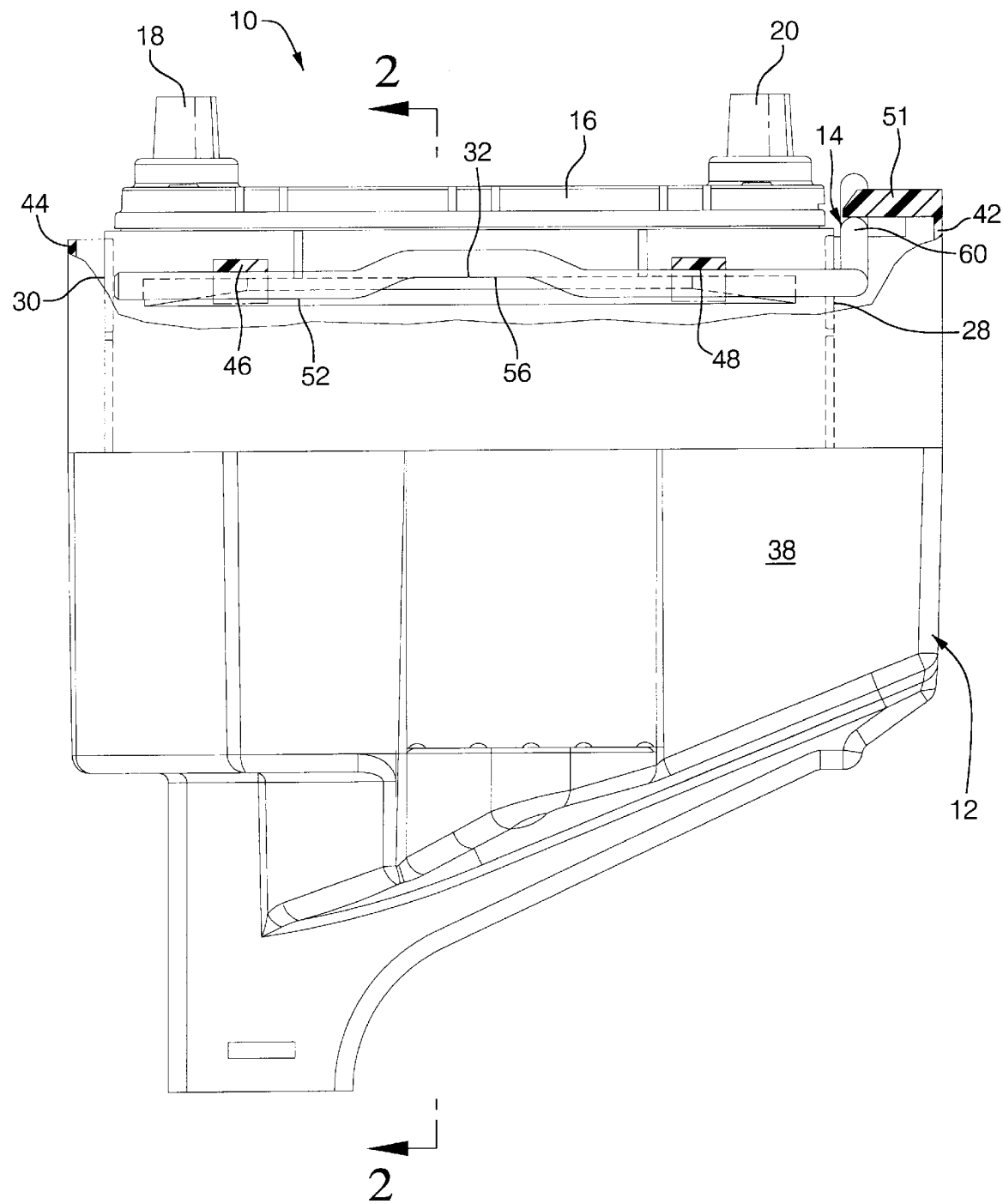
FIG. 1 is a front elevational view of a battery and tray incorporating the present invention.
Figure 2:
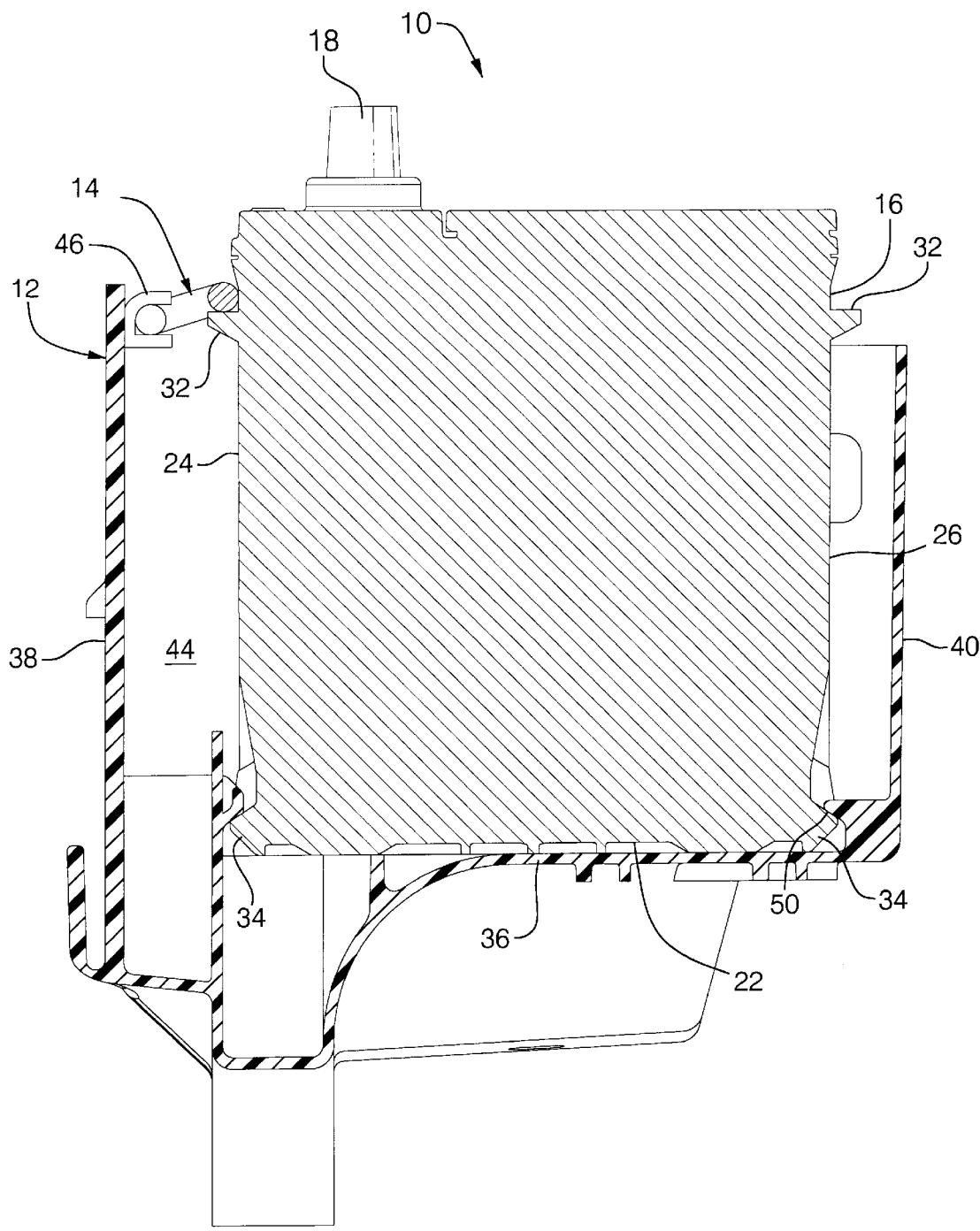
FIG. 2 is sectional view taken along line 2—2 in FIG. 1.
Figure 3:
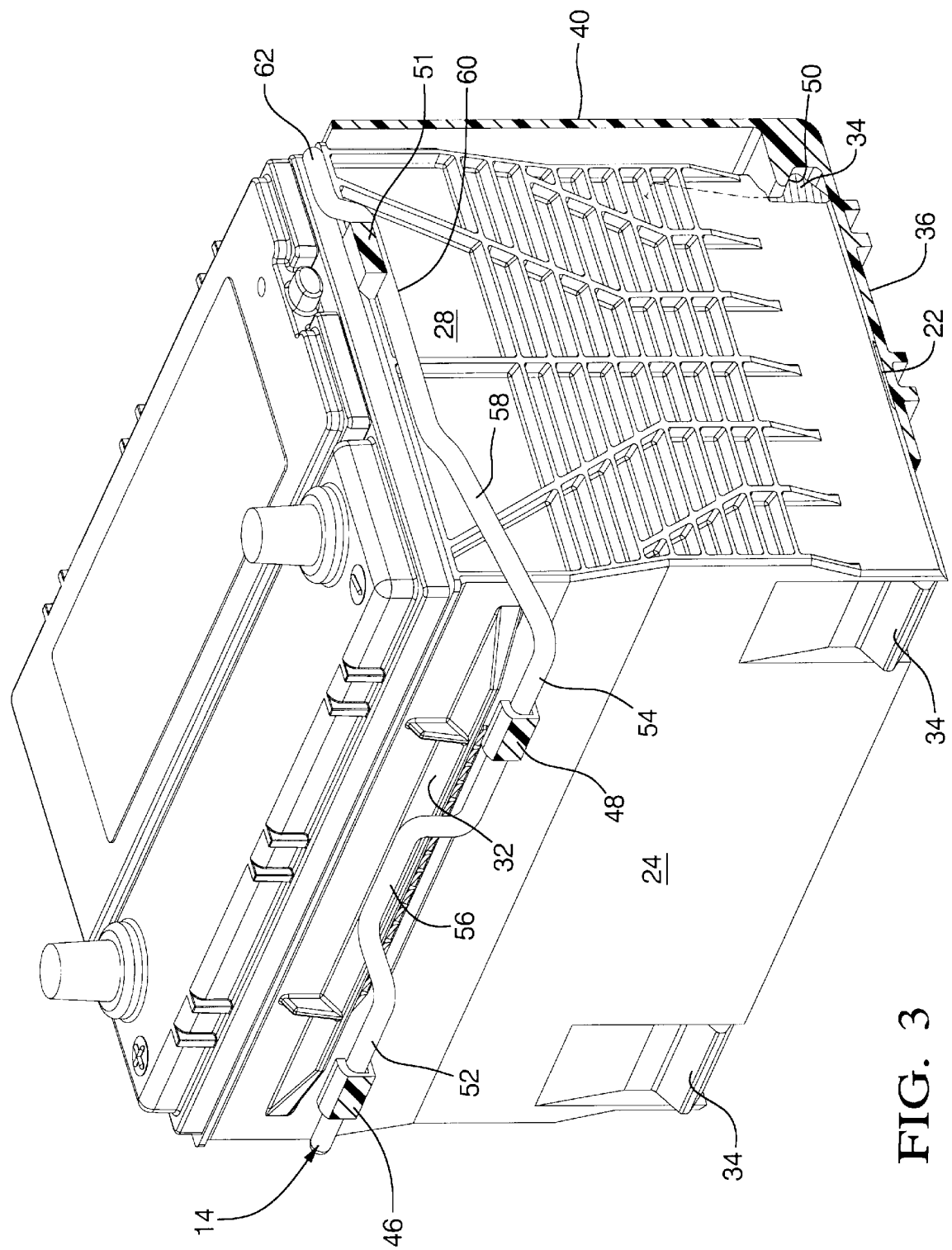
FIG. 3 is an isometric view of the battery and torsion rod with portions of the tray.
Figure 4:
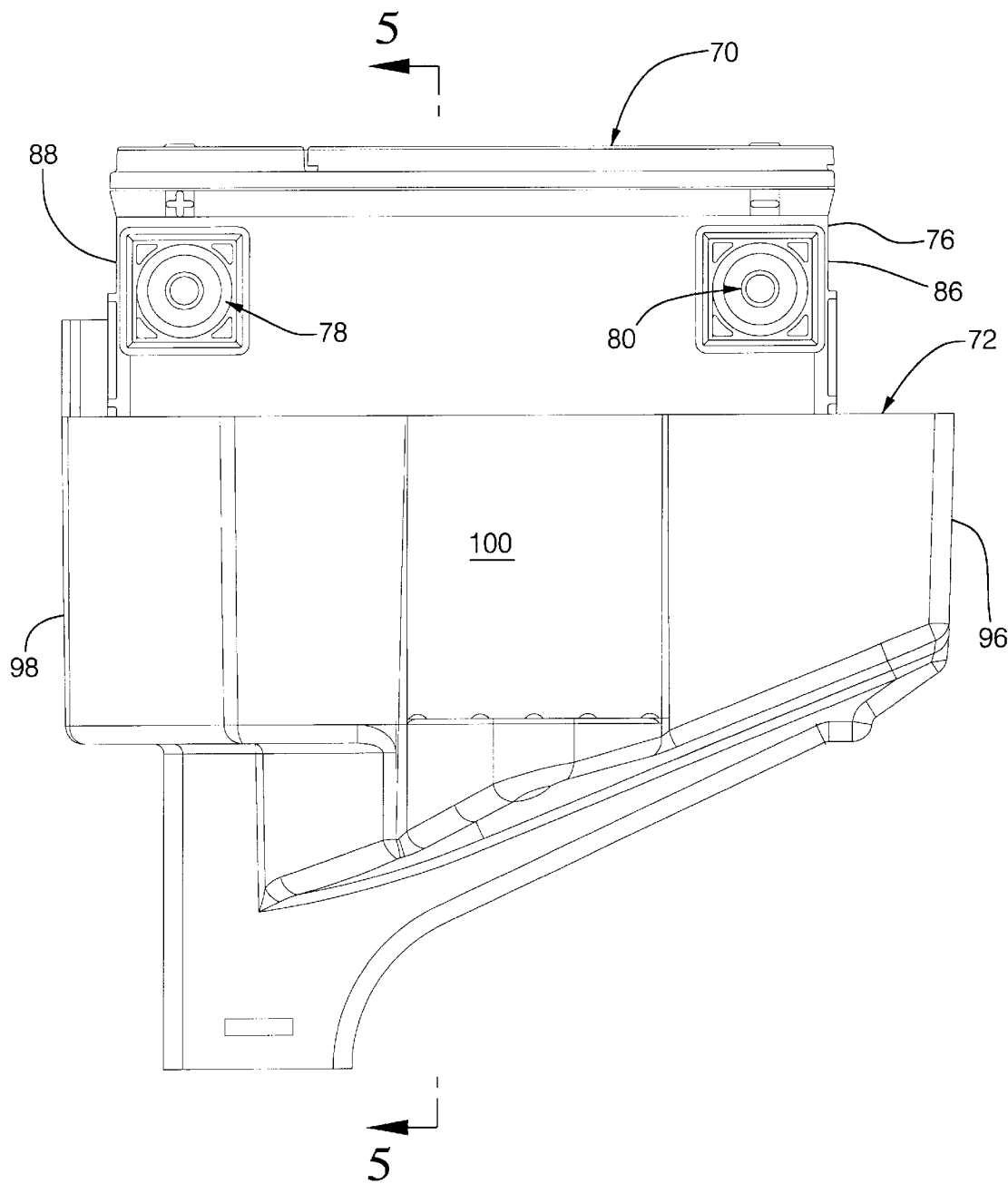
FIG. 4 is an elevational view of an another embodiment of the invention.

A battery 10 is secured in a tray 12 by a torsion rod 14 as seen in FIGS. 1, 2 and 3. The battery 10 is a conventional automotive battery having a case 16 which presents a positive terminal 18 and a negative terminal 20 for connection with cables, not shown. The battery has a bottom wall 22, front and rear walls 24, 26 and side walls 28, 30. The front wall 24 and rear wall 28 can be identical in structure. The front wall 24 and the rear wall 26 each have a ledge or holddown member 32 and at least two locator extensions 34.

The tray 12 is preferably a molded plastic member having a bottom wall 36, supporting the battery 10, front and rear wall 38 and 40 and side walls 42 and 44. The front wall 38 has at least a pair of spaced hinge members 46 and 48. The rear wall 40 has locator recesses 50 in which the locator extensions 34 are positioned when the battery 10 is correctly located in the tray 12. The side wall 42 has a latch member 51

The torsion rod 14 is preferably a spring steel component having a pair of spaced, longitudinally aligned hinge sections 52 and 54. Intermediate the hinge portions 52, 54 is a holddown portion 56 which is laterally offset from the hinge portions 52, 54. Extending approximately ninety degrees from the hinge portion 54 is an operator lever 58 that has a latch portion 60 and an end 62.

The hinge portions 52 and 54 are pivotally disposed in the hinge members 46 and 48 respectively. The torsion rod 14 is therefore pivotally mounted in the tray 12. When the torsion rod 14 is pivoted counter clockwise from the position shown in FIG. 3 until the operator lever 58 is substantially vertical, the battery 10 is free for removal from tray 12.

When the battery 10 is positioned in the tray 12, the operator lever 58 is pivoted clockwise toward the position shown in FIG. 3. The holddown portion 56 will engage the battery and urge the opposite side locator extensions 34 into the recesses 50 and the holddown portion 56 will be in abutment with the ledge 32. Further pivoting of the torsion rod 14 will result in an increase of retaining force at the ledge 32 until the latch portion 60 can be engaged under the latch member 51. If desired, the installer of the battery 10 can urge the locator portions into engagement with the locator recesses during installation such that the torsion rod 14 does not need to move the battery 10 laterally in the tray 12.

The battery 10 can be released from the tray 12 by manipulation of the end 62 toward the battery 10 until the latch member 51 is cleared. Then the lever 58 is pivoted upward releasing the ledge 32 from the holddown portion 56. This provides a simple economic and toolless battery installation.

The embodiment shown in FIGS. 4, 5, 6 and 7 includes a battery 70, a tray 72 and a torsion rod 74. The battery 70 is also a conventional automotive battery having a case 76, a positive terminal 78 and a negative terminal 80. The case 76 has a front wall 82 on which the terminals 78 and 80 are disposed, a rear wall 84 and side walls 86, 88. The front wall 82 has a locator extension 90 and the rear wall 84 has a similar extension 92.

The tray 72 has a bottom wall 94 supporting the battery 70, a pair of side walls 96, 98 a front wall 100 and a rear wall 102. The side wall 96 has a latch member 104 and the rear wall 102 has a pair of spaced hinge members 106 and 108.

Figure 5:
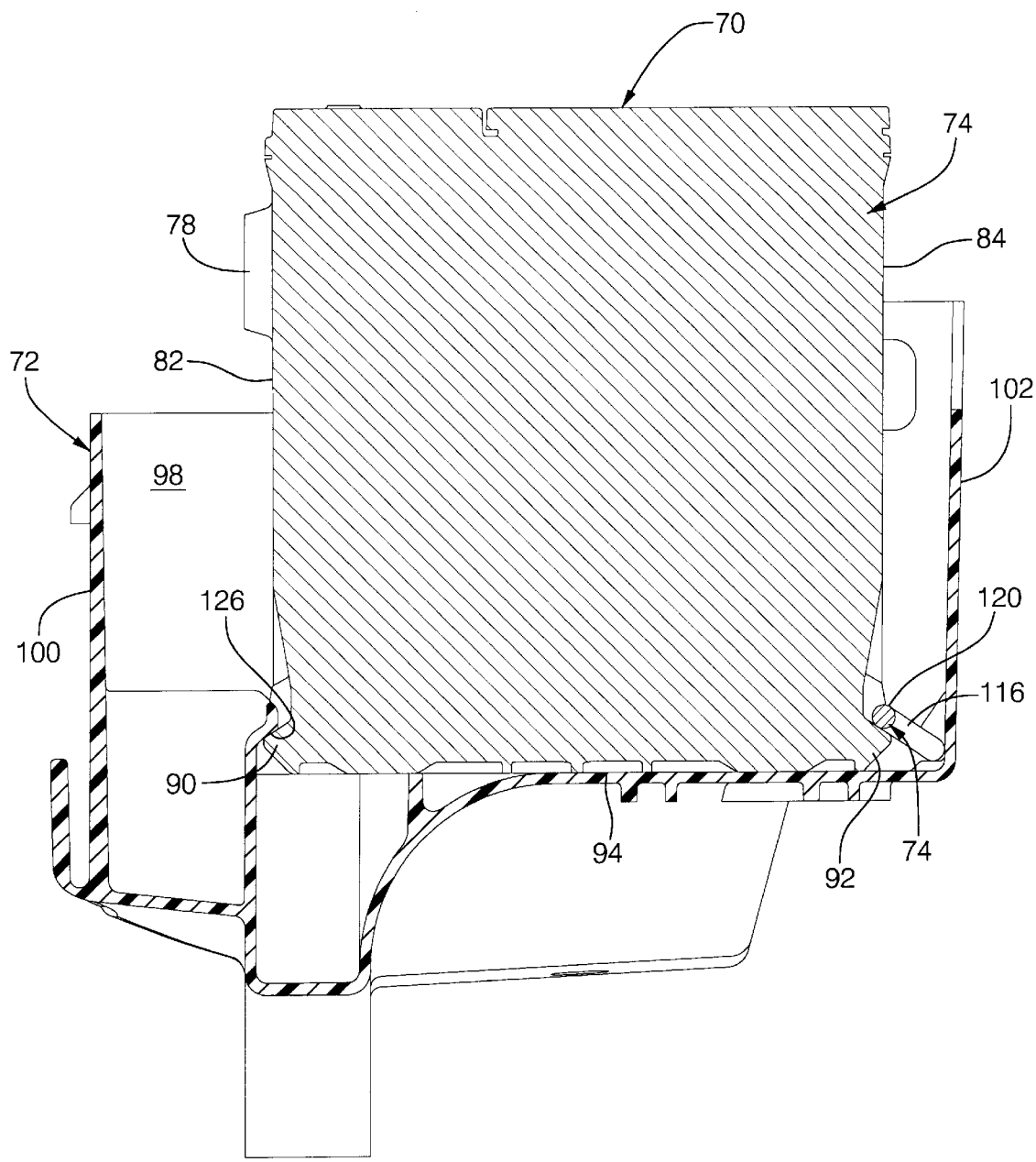
FIG. 5 is a view taken along line 5—5 in FIG. 4.
Figure 6:
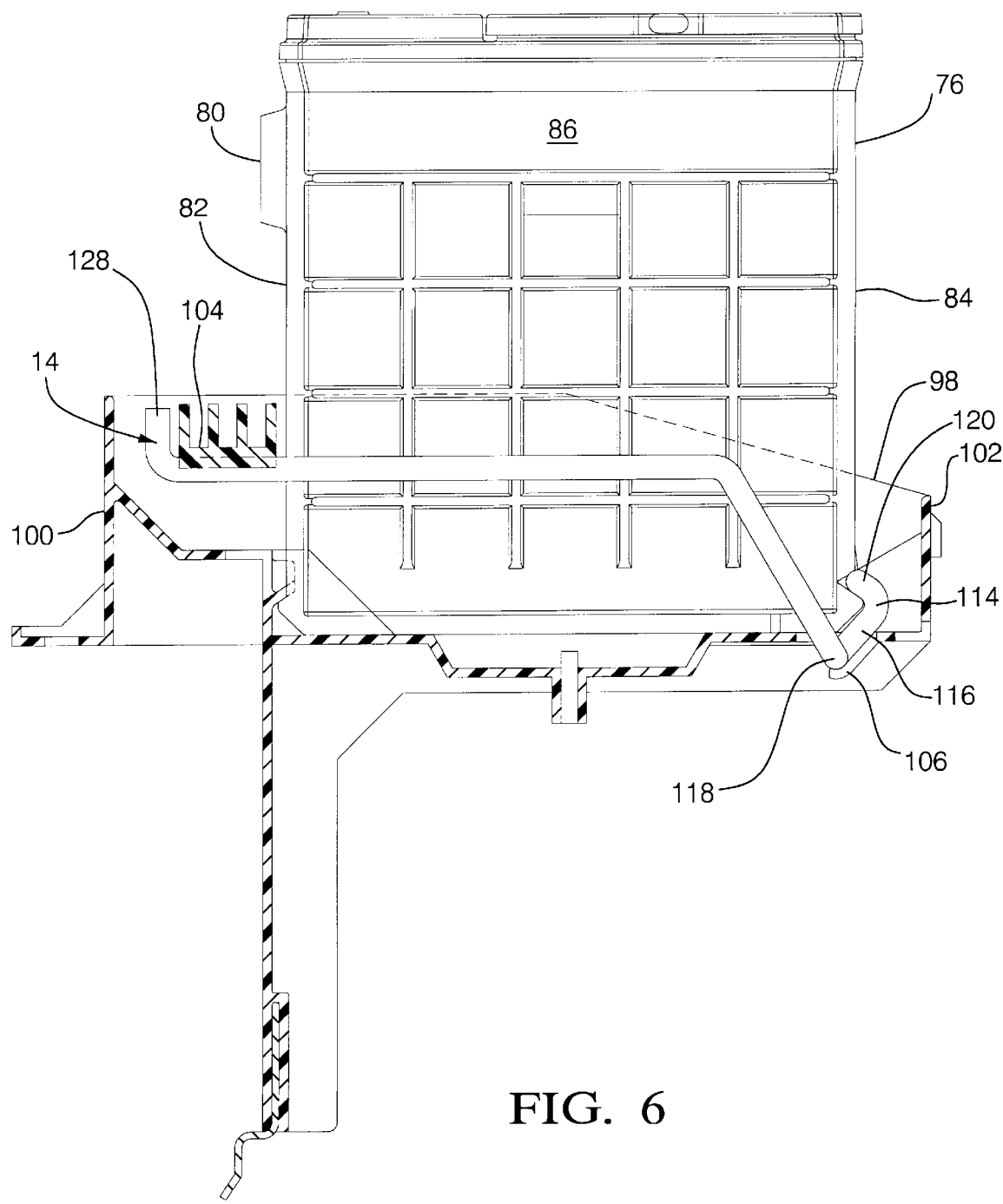
FIG. 6 is a side elevational view of the embodiment in FIGS. 4 and with a portion of the tray removed.
Figure 7:
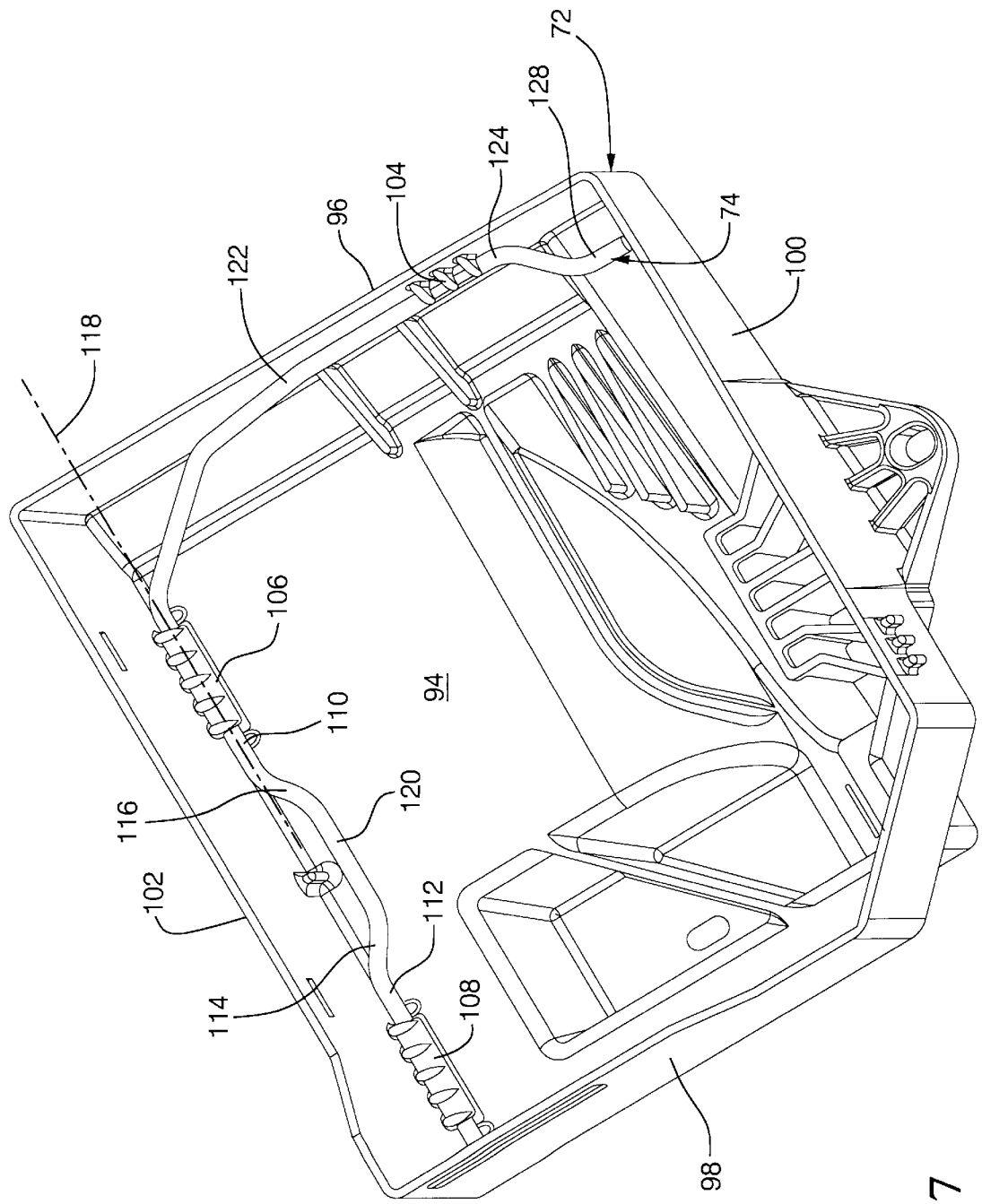
FIG. 7 is an isometric view of the tray and torsion rod used with the embodiment of FIGS. 4, 5 and 6.

The torsion rod 74 has longitudinally aligned, spaced hinge portions 110, 112 which are engaged in the hinge members 106 and 108 respectively. A latch portion 114 is formed between the hinge portions 110 and 112. As best seen in FIGS. 5, 6 and 7 the latch portion 114 has connecting components 116 angularly displaced from the longitudinal axis 118 of the hinge portions 110 and 112 and a latch or holddown component 120 between the connecting components 116. The torsion rod 74 also includes an operator lever portion 122 extending from the hinge portion 110 along the side wall 96. The lever portion has a latch component 124 which cooperates with the latch member 104 to secure the torsion rod in the latched position shown in FIGS. 5, 6 and 7. In FIG. 6, the side wall 96, with the exception of the latch member 104, has been removed for clarity.

In the latched position, the locator extension 90 is disposed in an extension recess 126 formed on the front wall 72 and the locator extension 92 is clamped by the holddown component 120 of the torsion rod 74. To release the battery, an end 128 of the torsion rod 74 is moved leftward, as viewed in FIG. 7, until the latch component 124 is disengaged from the latch member 104. The lever 122 is pivoted upward in the hinges 106 and 108 until the holddown component 120 releases the locator extension 92. At this time, the locator extension 90 can be manipulated from under the recess 126 and the battery 70 can be lifted from the tray 72. It should be apparent to those skilled in the art, that the battery can be installed in the tray with the front wall 82 of the battery 70 facing either the front wall 100 or the rear wall 102 of the tray 72. It will also be appreciated that the locator extensions 90 and 92 serve as a holddown ledge, when engaged by the torsion rod 74, or a locator element, when engaging the recess 126, depending upon the disposition of the battery 70 in the tray 72.

As with the embodiment shown in FIGS. 1, 2 and 3, this embodiment provides a simple, economical, expedient and toolless apparatus for retaining a battery in a tray. The torsion rod provides an easily manipulable structure which can be operated with one hand. The structures described above do not require the installer to use any tools in either the installation or removal of the battery from a vehicle.

What is claimed is:

1. A battery retaining apparatus, comprising:
   (a) battery having upper and lower holddown means;
   (b) tray housing said battery having a hinge mechanism and a latching member positioned toward an upper portion of the tray proximal the upper portion of the battery and means, positioned on opposing sides of a lower portion of the tray, for engaging the lower holddown means of the battery; and
   (c) a torsion rod having a hinge portion pivotally supported in said hinge mechanism, a latch portion selectively engageable with said latching member, retaining means for engaging said holddown means on said battery and an operator means for pivoting said torsion rod in said hinge mechanism between a latched position with said retaining means engaging said holddown means and an unlatched position with said retaining means being released from said holddown means.

2. A battery retaining apparatus as recited in claim 1, wherein said tray surrounds a substantial portion of the lateral sides of the battery.

3. A battery retaining apparatus, comprising:
   (a) battery having engageable locator extensions on opposing sides of a lower portion and a retaining ledge on an upper portion;
   (b) tray housing having a bottom wall supporting said battery, at least two walls extending upward from said bottom wall, a hinge mechanism formed integrally with an upper portion of one of said side walls proximal to an upper portion of the battery and a latching member formed integrally with the other side of said side walls proximal to an upper portion of the battery, and locator recesses positioned on opposing sides on a lower portion of the tray for engaging the locator extensions of the battery; and
   (c) a torsion rod having a hinge portion pivotally supported in said hinge mechanism, a latch portion disposed for selective engagement with said latching member, a retaining portion adjacent said hinge portion to be selectively engaged with said retaining ledge on said battery and an operator lever for selectively pivoting said torsion rod in said hinge mechanism between a latched position with said retaining portion engaging said retaining ledge and an unlatched position with said retaining portion being released from said retaining ledge.

4. A battery retaining apparatus as recited in claim 3, wherein:
   (a) said side walls are orthogonally disposed relative to each other and to said bottom wall;
   (b) said hinge member comprises spaced hinge structures and said retaining portion is disposed intermediate said hinge structures; and
   (c) said operator lever extending substantially ninety degrees from hinge portion.

5. A battery retaining apparatus as recited in claim 4, wherein a generally linear section of the operator lever is retained beneath said retaining portion.

6. A battery retaining apparatus as recited in claims 3, wherein the walls of the tray housing substantially surround the walls of the retained battery.

* * * * *